United States Patent
Blaschke et al.

(10) Patent No.: US 11,162,680 B2
(45) Date of Patent: Nov. 2, 2021

(54) PROCESS FOR OPERATING A FUEL-OPERATED VEHICLE HEATER AND FUEL-OPERATED VEHICLE HEATER

(71) Applicant: Eberspächer Climate Control Systems GmbH & Co. KG, Esslingen (DE)

(72) Inventors: Walter Blaschke, Deizisau (DE); Michael Humburg, Göppingen (DE); Wolfgang Pfister, Esslingen (DE); Hans Jensen, Dettingen unter Teck (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 255 days.

(21) Appl. No.: 16/284,029

(22) Filed: Feb. 25, 2019

(65) Prior Publication Data

US 2019/0264915 A1 Aug. 29, 2019

(30) Foreign Application Priority Data

Feb. 26, 2018 (DE) ...................... 10 2018 104 242.6

(51) Int. Cl.
*F23N 1/02* (2006.01)
*B60H 1/22* (2006.01)
(Continued)

(52) U.S. Cl.
CPC ........... *F23N 1/027* (2013.01); *B60H 1/2206* (2013.01); *F23D 3/40* (2013.01); *F23N 5/242* (2013.01);
(Continued)

(58) Field of Classification Search
CPC .......... F23N 1/027; F23N 5/242; F23N 5/003; F23N 2225/04; F23N 2225/06;
(Continued)

(56) References Cited

U.S. PATENT DOCUMENTS 3,101,897 A * 8/1963 Vaughn ................... F23N 1/027
236/1 E
4,677,357 A * 6/1987 Spence .............. G05D 23/1906
388/816
(Continued)

FOREIGN PATENT DOCUMENTS

DE 10143459 A1 4/2003
DE 102011052324 A1 2/2013
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A fuel-operated vehicle heater includes a burner area (12) with a combustion chamber (14); a fuel pump (24); and a combustion air blower (28). A pressure sensor (38) detects a feed back pressure. An actuating unit (36) actuates the fuel pump (24) with a predefined value of a pump operating variable, and actuates the combustion air blower with a predefined value of a blower operating variable. A heater process includes detecting the feed back pressure in case of a feed operating state set during the combustion operation and comparing the detected feed back pressure ($P_e$) with an expected feed back pressure ($P_E$) for the set feed operating state. If the detected feed back pressure deviates from the expected feed back pressure the pump operating variable is changed such that the feed back pressure changes toward the expected feed pressure and/or essentially corresponds to the expected feed back pressure.

15 Claims, 3 Drawing Sheets

(51) Int. Cl.
*F23N 5/24* (2006.01)
*F23D 3/40* (2006.01)

(52) U.S. Cl.
CPC ............... *B60H 2001/2256* (2013.01); *B60H 2001/2271* (2013.01); *B60H 2001/2284* (2013.01); *F23D 2900/21002* (2013.01); *F23N 2225/04* (2020.01); *F23N 2241/14* (2020.01)

(58) Field of Classification Search
CPC .... F23N 2225/10; F23N 2225/14; F23N 1/02; F23N 1/022; F23N 3/08; F23N 3/082; F23N 3/002; F23N 2900/05181; B60H 1/2206; B60H 2001/2256; B60H 2001/2271; B60H 2001/2284; B60H 2001/224; F23D 3/40; F23D 2900/21002; G23F 2900/21002
USPC .................................................. 237/12.3 C
IPC .................. F23N 1/02,5/24, 3/08; B60H 1/22, B60H 1/03
See application file for complete search history.

(56) References Cited

U.S. PATENT DOCUMENTS

| | | | | |
|---|---|---|---|---|
| 5,085,576 A * | 2/1992 | Bonne | ............ | F23N 5/242 431/22 |
| 5,732,691 A * | 3/1998 | Maiello | ............ | F23N 1/022 126/116 A |
| 6,059,194 A * | 5/2000 | Wintrich | ............ | G05D 21/02 236/15 BD |
| 6,106,282 A | 8/2000 | Humburg et al. | | |
| 6,561,791 B1 * | 5/2003 | Vrolijk | ............ | F23N 1/022 431/12 |
| 2001/0032571 A1 * | 10/2001 | Howlett | ............ | F23N 1/027 110/185 |
| 2001/0051321 A1 * | 12/2001 | La Fontaine | ............ | F23N 1/022 431/12 |
| 2003/0013057 A1 * | 1/2003 | Vegter | ............ | F23N 5/184 431/90 |
| 2004/0185770 A1 * | 9/2004 | Soeholm | ............ | F23N 3/002 454/239 |
| 2007/0209653 A1 * | 9/2007 | Beisheim | ............ | F23N 3/002 126/80 |
| 2012/0058439 A1 * | 3/2012 | Munsterhuis | ............ | F23N 5/003 431/12 |
| 2014/0080075 A1 * | 3/2014 | Young | ............ | F23N 1/022 431/76 |
| 2015/0233578 A1 * | 8/2015 | Monteiro | ............ | F23N 3/082 431/12 |
| 2018/0037088 A1 * | 2/2018 | Pfister | ............ | F23N 5/14 |
| 2018/0094809 A1 * | 4/2018 | Lochschmied | ............ | F23N 1/025 |
| 2019/0203936 A1 * | 7/2019 | Hazzard | ............ | F23N 5/242 |
| 2019/0263224 A1 * | 8/2019 | Humburg | ............ | B60H 1/2212 |
| 2019/0264915 A1 | 8/2019 | Blaschke et al. | | |

FOREIGN PATENT DOCUMENTS

| | | |
|---|---|---|
| DE | 10 2012 215 414 A1 | 1/2014 |
| DE | 102016104142 A1 | 9/2017 |
| DE | 102018104242 A1 | 8/2019 |
| EP | 3530504 A1 | 8/2019 |
| JP | 53010145 A * | 1/1978 ............ F23N 1/027 |

\* cited by examiner

PROCESS FOR OPERATING A FUEL-OPERATED VEHICLE HEATER AND FUEL-OPERATED VEHICLE HEATER

CROSS REFERENCE TO RELATED APPLICATIONS

This application claims the benefit of priority under 35 U.S.C. § 119 of German Application 10 2018 104 242.6, filed Feb. 26, 2018, the entire contents of which are incorporated herein by reference.

TECHNICAL FIELD

The present invention pertains to a process for operating a fuel-operated vehicle heater.

BACKGROUND

In connection with efforts to reduce crude oil consumption and to lower the emission of hazardous substances, attempts are increasingly being made to also use synthetically produced fuels to operate fuel-operated vehicle heaters. Such a synthetic fuel is, for example, OME (oxymethylene ether).

One problem in using such fuels is that these have a different, generally lower calorific value than conventional fuels, for example, diesel. If such synthetic fuel is used or mixed with conventionally used fuel, for example, diesel, this may lead to the problem that the combustion carried out with a mixture of combustion air and fuel produced at that time during an operation of a vehicle heater on the basis of operating parameters predefined for conventional fuels, for example, diesel, may lead to an excess emission of hazardous substances, on the one hand, and, on the other hand, cannot supply the heat output actually expected for the operation of the heater. The basis of this problem is that no direct information about the grade of the fuel being used is generally available or can be made available for the heater. There is also generally no possibility of being able to evaluate the quality of the combustion taking place by the detection of the $CO_2$ content in the waste gas and to take compensatory actions based thereon in the actuation of a combustion air blower or of a fuel pump, especially in retrofit systems despite the possibility of being able to provide a sensor detecting the $CO_2$ content in the waste gas.

SUMMARY

An object of the present invention is to provide a process for operating a fuel-operated vehicle heater and a fuel operated fuel heater so operated, with which a heat output needed for the required operation of the heater can also be ensured in a reliable manner when using fuels of different grades.

According to the present invention, this object is accomplished by a process for operating a fuel-operated vehicle heater, the vehicle heater comprising a burner area with a combustion chamber; a fuel pump for feeding fuel to the combustion chamber; and a combustion air blower for feeding combustion air to the combustion chamber, a pressure sensor being associated with the combustion air blower for detecting a feed back pressure downstream of the combustion air blower; further comprising an actuating unit for actuating the fuel pump such that the fuel pump is operated with a predefined value of a pump operating variable, and for actuating the combustion air blower such that the combustion air blower is operated with a predefined value of a blower operating variable, in which process associated with feed operating states and with a reference fuel defined by the pump operating variable and the blower operating variable, information on a feed back pressure to be expected in each case is provided, wherein the process further comprises the following steps:

a) detection of the feed back pressure in case of a feed operating state set during the combustion operation, b) comparison of the detected feed back pressure with the feed back pressure to be expected for the set feed operating state, and c) if the detected feed back pressure deviates from the feed back pressure to be expected, changing of the pump operating variable such that the feed back pressure changes in the direction toward the expected feed back pressure or/and essentially corresponds to the expected feed back pressure.

It is possible with the process according to the present invention to compensate for changes in the fuel to be burned, which changes occur in the state of combustion and become noticeable in the form of a changed feed back pressure, and thus to ensure that the heat output needed for a predefined heating operation can be ensured even when using fuels of different grades.

The combustion air blower may comprise a rotatable feed wheel, and the blower operating variable preferably corresponds to a speed of the feed wheel. Further, the fuel pump may comprise a pump piston with periodic reciprocating motion, and the pump operating variable may then correspond to a rate of motion of the pump piston.

A feed operating state may be defined as a ratio of the speed of the feed wheel to the rate of motion of the pump piston. It is in this pump piston that the expected feed back pressure ($P_E$) is predefined as a command variable in association with a predefined heating operation, and the detected feed back pressure ($P_e$) is changed in a pressure control as a control variable by changing the pump operating variable as a manipulated variable in the direction toward the expected feed back pressure ($P_E$).

In this connection, it should be pointed out that regardless of how the information available is going to be processed, this ratio may be defined as speed/rate of motion (speed with respect to rate of motion) or may be defined as rate of motion/speed (rate of motion with respect to speed).

The procedure to be carried out according to the present invention may run within the framework of a control of the feed back pressure, in which control the expected feed back pressure is used as the command variable and the expected feed back pressure is the control variable to be adjusted in the direction toward the expected feed back pressure. The variable influenced by the control in this case, i.e., the manipulated variable, is the ratio of speed to rate. In principle, the speed of the combustion air blower, i.e., the fed quantity of air, remains unchanged and the rate, i.e., the fed quantity of fuel, is changed or adapted within the framework of a control loop.

As an alternative or in addition to such a control, for compensation of changes in the characteristic of the combustion being reflected in a change in the feed back pressure, a correction variable may be determined for the feed operating state associated with the expected feed back pressure in step c) as a function of the deviation between the detected feed back pressure and the expected feed back pressure, and the pump operating variable may be changed such that a feed operating state corrected by the correction variable is obtained. It can be ensured with such a step that the feed back pressure is very rapidly moved in the direction toward the desired value, i.e., to the expected feed back pressure.

It may especially be possible to proceed such that a deviation between the ratio associated with the expected feed back pressure and the ratio associated with the detected feed back pressure is determined, that a feed operating state deviating from the set feed operating state to the same extent as the deviation but in the opposite direction of deviation is determined as the corrected feed operating state, and that a pump operating variable associated with the corrected feed operating state with the blower operating variable being essentially unchanged is used as the changed pump operating variable to obtain the corrected feed operating state.

A change in the combustion characteristic in case of a feed operating state that is unchanged per se may, for example, also be induced by a change in the air pressure and thus a change in the quantity of oxygen fed by the blower. In order to be able to distinguish, for example, such a change in the ambient conditions, which change has an effect on the combustion characteristic, from a state, in which a change in the combustion characteristic is triggered due to the use of a different fuel, it may further be provided that the vehicle heater comprise a waste gas temperature sensor for providing waste gas temperature information, and that a reference waste gas temperature and a reference feed back pressure be determined in association with a reference feed operating state, and that step c) be carried out if the detected waste gas temperature and the detected feed back pressure deviate in a predefined manner from the reference waste gas temperature and from the reference feed back pressure in case of a set reference feed operating state.

Provisions may especially be made for step c) to be carried out if the detected waste gas temperature is below the reference waste gas temperature and the detected feed back pressure is below the reference feed back pressure.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
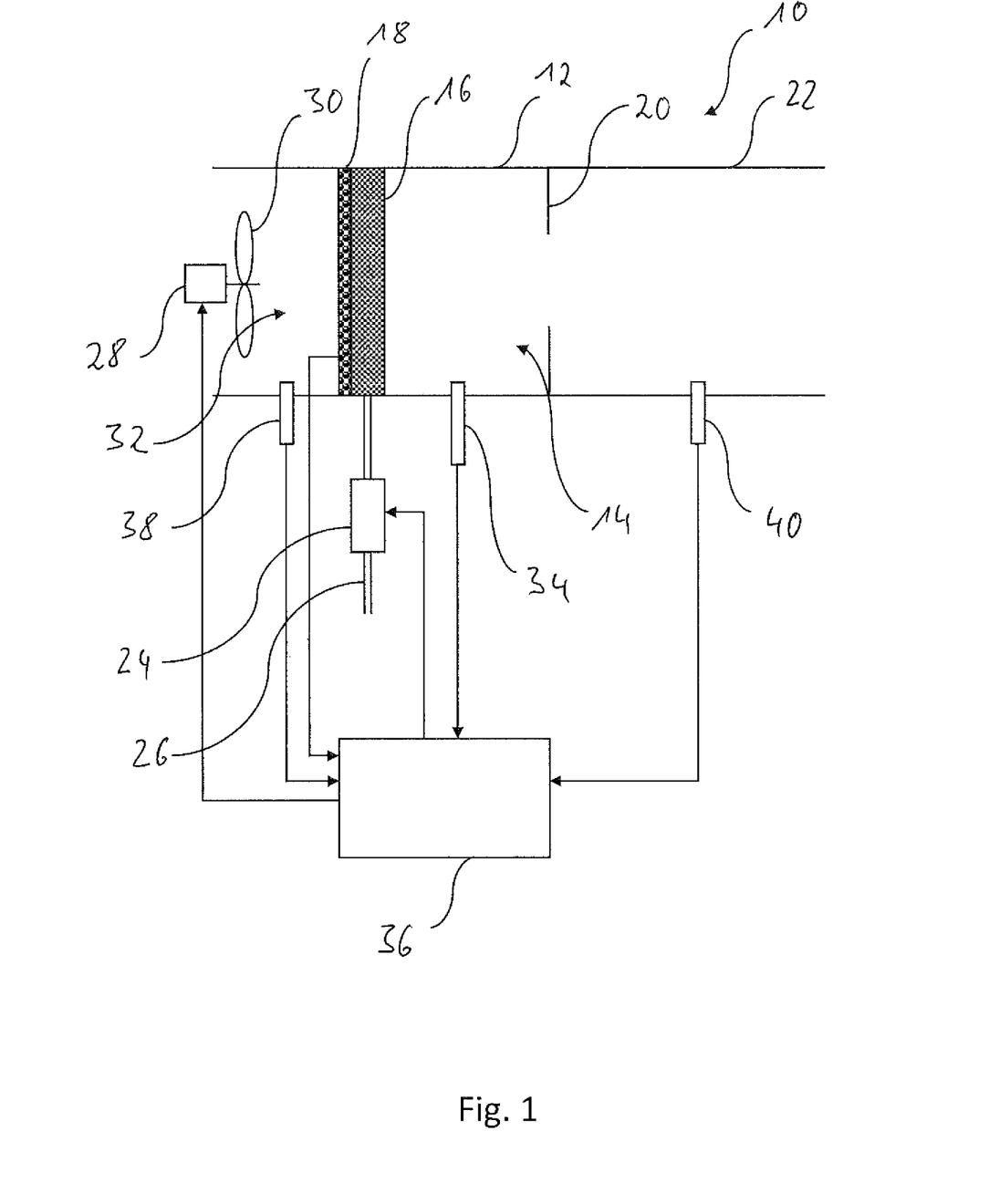
FIG. 1 is a schematic view of a fuel-operated vehicle heater.

Referring to the drawings, a fuel-operated vehicle heater is generally designated by 10 in FIG. 1. The vehicle heater 10 comprises a burner area 12 with a combustion chamber 14 formed in it. A porous evaporator medium 16, for example, metal nonwoven, metal mesh, foamed ceramic or the like, is provided at a bottom area of the burner area 12. Further, an electrically energizable heating device 18 may be provided at the bottom area, which heating device 18 may support an evaporation of fuel from the porous evaporator medium 16 especially during the start phase of the combustion operation. The combustion chamber 14 is essentially further defined by a flame diaphragm 20. The combustion waste gases generated during combustion flow into a flame tube 22 in the direction toward a heat exchanger unit, in which heat transported in the combustion waste gases can be transferred to a medium to be heated, for example, air or water.

A fuel pump 24, for example, a feed pump, which is configured with a pump piston with periodic reciprocating motion, feeds the fuel needed for combustion from a fuel storage device, not shown, via a fuel line 26 into the porous evaporator medium 16. The liquid fuel is distributed in the evaporator medium 16 due to capillary feed action and is evaporated towards the combustion chamber 14 on the side of the evaporator medium facing the combustion chamber 14.

A combustion air blower, which is generally designated by 28, feeds the air needed for combustion by means of a feed wheel 30, which is driven to rotate, into a volume 32 upstream of the combustion chamber 14, which volume is also generally designated as plenum. The combustion air fed by the combustion air blower 28 flows into the combustion chamber 14 and is mixed there with the fuel vapor via openings provided in a circumferential wall of the combustion chamber assembly unit 12 enclosing the combustion chamber 14 or/and in a combustion air inlet pipe provided at the bottom area, which openings are provided or otherwise allow the entry of air into the combustion chamber 14. The mixture of combustion air and fuel vapor thus generated may be ignited at the beginning of the combustion operation by means of an ignition element 34, for example, a glow plug.

The fuel pump 24, the combustion air blower 28, the heating device 18 and the ignition element 34 are actuated by an actuating unit generally designated by 36. The actuating element 36 comprises one or more processors and associated memory. Corresponding to the combustion operation predefined for the heater 10 or the required heat output, the actuating unit 36 actuates the fuel pump 24 and the combustion air blower 28 such that a combustible mixture of combustion air and fuel is provided in the desired mixing ratio and with the quantity in the combustion chamber 14 needed for combustion. In this case, a feed operating state associated with a required heat output can be defined by using the speed of the feed wheel 30 as a blower operating variable and the rate of motion of a pump piston of the fuel pump 24 as a pump operating variable. In particular, such a feed operating state may be defined as the ratio of the speed to the rate of motion. For any heat output required during the heating operation or for a corresponding feed operating state, a predefined speed and a correspondingly predefined rate of motion may thus be predefined or be stored, for example, in the form of a table or of a characteristic diagram in the memory of the actuating unit 36. If a defined heat output shall be selected, the fuel pump 24 and the combustion air blower 28 are actuated such that they are operated with the speed and rate of motion associated with this heat output and with the corresponding feed operating state. For example, the actuating unit 36 may control the speed and of the rate of motion. A direct detection of the fed quantity of air or of the fed quantity of fuel does not generally take place. There is also generally no information available as to what type of fuel is used for the combustion.

A pressure sensor 38 is associated with the heater 10. This pressure sensor 38 is arranged downstream of the combustion air blower 28, for example, in the volume 32, and consequently detects the feed back pressure, i.e., the pressure against which the combustion air blower 28 feeds. However, a temperature sensor 40, which may be provided, for example, in the area of the flame tube 22 or even further downstream, may, in principle, also be provided in the area of the combustion chamber 14, detects the temperature of waste gas leaving the combustion chamber 14. Both the waste gas temperature and the feed back pressure are parameters, which are connected with the proceeding combustion. The more fuel is burned, the greater is the quantity of waste gas generated during the combustion and the greater is the pressure, against which the combustion air blower 28 must feed. The more fuel is burned, the greater is the quantity of energy released during the combustion and the higher is the waste gas temperature.

The grade of the fuel to be burned also has an effect on the parameters detected by the sensors 38, 40. When burning a high-grade fuel, for example, diesel, a greater quantity of energy is released per burned unit quantity of the fuel, which leads to a correspondingly greater waste gas volume and feed back pressure and also to a correspondingly higher waste gas temperature. A fuel of lower grade, for example, OME, results in the release of a lower quantity of energy and accordingly a lower waste gas temperature as well as a lower feed back pressure in case of the same fed quantity of fuel. The present invention utilizes this to carry out corrective measures during the combustion operation in the manner described below. This guarantees that the use of fuels of different grades does not result in a heat output required for a combustion operation to be set not being reached, even though the quantity of fuel predefined in association with this heat output and the correspondingly associated quantity of combustion air are fed into the combustion chamber 14.

Figure 2:
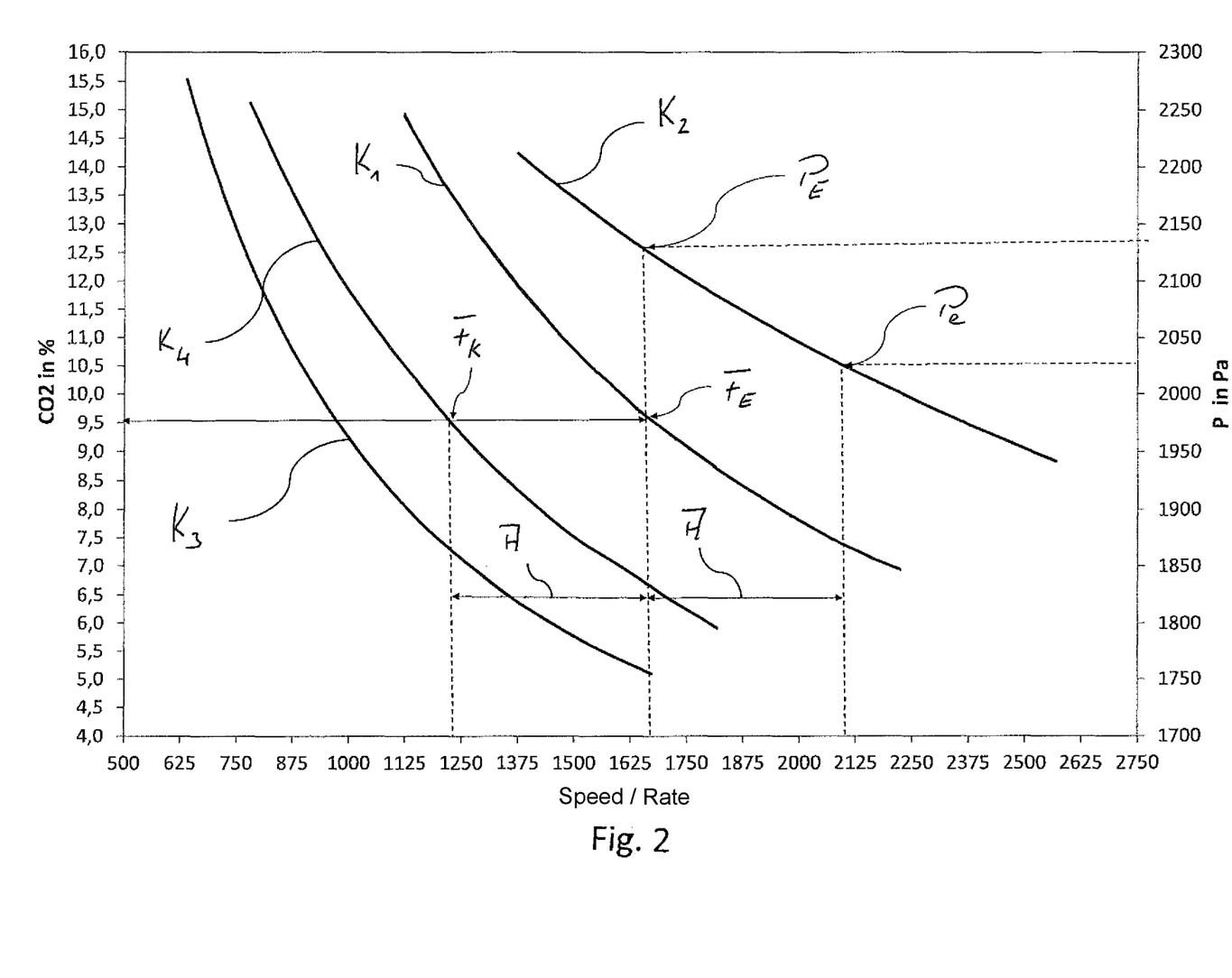
FIG. 2 is a diagram with a speed/rate (frequency) ratio representing a feed operating state in association with different types of fuel represented by the $CO_2$ content in the waste gas occurring during combustion, as well as the feed back pressure occurring.

FIG. 2 shows the connection between a feed operating state and the $CO_2$ content in the waste gas on the basis of the curve $K_1$ for a reference fuel, i.e., for example, diesel. The feed operating state is defined by the ratio between a blower operating variable represented by the speed of the feed wheel 30 and a pump operating variable represented by the rate of motion of a pump piston of the fuel pump 24. In particular, the feed operating state is defined by a speed/rate ratio. In order to reach a $CO_2$ content of about 9.5% to 9.6%, a feed operating state is set, in which the speed/rate ratio is about 1670. Assuming that the operation is carried out with this feed operating state $F_E$, using diesel as fuel, it can be expected that a feed back pressure $P_E$ of about 2135 Pa is set during the then proceeding combustion. It should be pointed out that in association with curve $K_1$, the curve $K_2$ represents the feed back pressure to be expected for a corresponding feed operating state.

Curve $K_3$ represents for different feed operating states, i.e., different speed/rate ratios, the $CO_2$ content respectively contained in the waste gas for an alternative fuel, for example, OME. Since this alternative fuel has a markedly lower calorific value than diesel, the combustion of the same quantity of fuel, i.e., operating with the same speed/rate ratio, leads to a lower $CO_2$ content in the waste gas. In order to reach the same state of combustion, i.e., to be able to release the same heat output as well, which ultimately means that the $CO_2$ content is also in the same range, for example, about 9.5% to 9.6%, the operation would have to be carried out with a markedly higher fuel content in the mixture when using OME as fuel, which ultimately would mean a feed operating state represented by a markedly lower speed/rate ratio of about 890.

It should now be assumed that the vehicle heater 10 is operated with a fuel of unknown grade in a feed operating state corresponding to the feed operating state $F_E$. As has already been explained, the expected feed back pressure $P_E$ would be about 2135 Pa for the reference fuel diesel. It was, however, actually found that the detected feed back pressure $P_e$ is only about 2030 Pa. In case of unchanged blower operating variable, i.e., speed, and unchanged pump operating variable, i.e., rate of motion, it can, in principle, be assumed that such a feed back pressure $P_e$ being below the expected feed back pressure $P_E$ can be attributed to the use of a fuel with a lower calorific value.

Without having detailed knowledge about the grade of the fuel actually used, in order to be able to ensure that the combustion is again taking place such that the heat output needed for a defined operating state to be set is produced, the deviation A, between the feed operating state associated with the expected feed back pressure $P_E$ and the feed operating state associated with the detected feed back pressure $P_e$, is determined. Based on the set feed operating state $F_E$, a corrected feed operating state $F_K$ is then determined by a deviation from the feed operating state $F_E$ with the prior determined deviation A but in the opposite direction, i.e., while the detected feed back pressure $P_E$ implies the presence of a fictitious feed operating state being above the set feed operating state $F_E$ by the deviation A, the corrected feed operating state $F_K$ corrected in the sense described above means operating with a fuel content in the air/fuel mixture, which fuel content is increased to a corresponding extent. This leads to a $CO_2$ content of about 9.5% to 9.6% in turn being reached when using a fuel, whose feed operating state-$CO_2$ content relationship is represented by curve $K_4$, based on the increased quantity of fuel and with the quantity of air left unchanged, which ultimately means that the heater 10 can again be operated with the heat output predefined for a defined operating state. The correction explained above is thereby based on the assumption that the different curves shown in FIG. 2 can each be approximately interpreted as linear curves at least for smaller deviations.

With the procedure described above, the feed back pressure can be moved, in the manner of a control, very rapidly in the direction toward the expected feed back pressure, when a fuel different from the reference fuel is used. Since there is a clear connection between the feed back pressure and the quality of the proceeding combustion and thus of the heat output, it is thus guaranteed that, even though there is no direct knowledge about the fuel actually used, the required heat output for a predefined heating operation is reached. As an alternative or in addition, this required heat output, i.e., the setting of the feed back pressure associated with this heat output, may also be provided within the framework of a control loop. The feed back pressure to be expected for a heat output to be set forms the command variable as a desired value in the control loop, while the detected feed back pressure forms the control variable as an actual value. As manipulated variable, the quantity of the fed fuel, i.e., e.g., the rate, at which a pump piston of the fuel pump is moved, is influenced. By means of such a control, taking place, for example, as proportional control, it can equally be ensured that, without having detailed knowledge about the fuel actually used, the required heat output can also be provided by adjusting the feed back pressure to the expected feed back pressure. Such a control of the feed back pressure may also take place, for example, in connection with the procedure described above with reference to FIG. 2. In this case, using the procedure described above, the feed operating state can at first be changed with a single correction step such that it can be assumed that the feed back pressure occurring at that time already corresponds to the expected feed back pressure or is very close to it. If this correction has been carried out once, it can then be ensured within the framework of a precise control loop that a deviation between the detected feed back pressure, i.e., the control variable, and the expected feed back pressure, i.e., the command variable, which deviation is also possibly still present, is essentially entirely eliminated.

Figure 3:
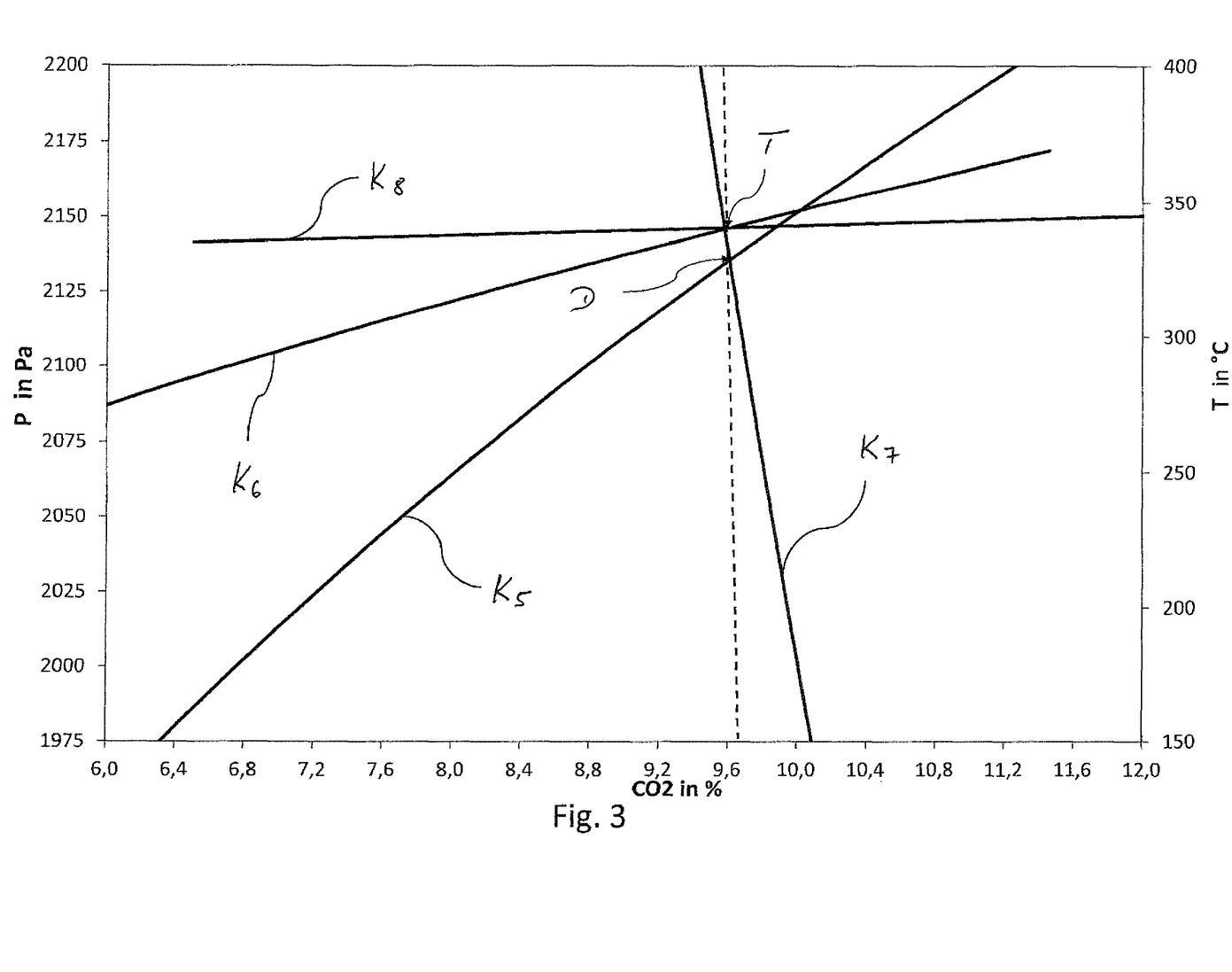
FIG. 3 is a diagram, which shows the waste gas temperature to be expected and the feed back pressure to be expected for a reference feed operating state.

As explained above, the described correction is especially carried out if it is detected that the feed back pressure detected in association with a set feed operating state does not correspond to the feed back pressure to be expected for this feed operating state. This may and is, as a rule, but does not have to absolutely be triggered by the use of a fuel of different grade. FIG. 3 shows values for the feed back pressure and the waste gas temperature to be expected, which are represented by a pressure point D and a temperature point T, for a defined operating state of the heater 10, in which this heater is operated with a feed operating state associated with this operating state such that a $CO_2$ content somewhat above 9.6% can be expected. For this defined operating state and for the feed operating state associated with same, the feed back pressure to be expected is about 2135 Pa, and the waste gas temperature to be expected is about 340° C. If, based on this defined operating state, a different fuel is used, i.e., for example, a fuel with higher OME content and thus correspondingly lower calorific value, the feed back pressure with the combustion air feed quantity unchanged decreases along a curve $K_5$. Based on the grade decreasing with increasing OME content in the fuel or accordingly decreasing calorific value, the combustion will lead to a lower $CO_2$ content in the waste gas. Correspondingly, the waste gas temperature decreases along a curve $K_6$ based on the temperature point T. This means that if the feed back pressure and the temperature decrease based on the reference feed back pressure predefined for a reference feed operating state, which corresponds to the pressure point D and to a reference waste gas temperature, which corresponds to the temperature point T, this is a clear indication that fuel with a lower calorific value than the reference fuel, i.e., for example, diesel, is used and the correction described above with reference to FIG. 2 can be carried out accordingly. For example, both in association with the waste gas temperature and in association with the feed back pressure, a corresponding threshold can be set here, the exceeding or falling short of which in the case shown is used as a criterion for the correction of the feed operating state shown in FIG. 2 being carried out.

The decrease of the feed back pressure may, however, also be indicated by a decreasing air pressure and thus by a lower oxygen content per fed air unit quantity. This may, for example, be the case if weather changes lead to a change in air pressure or a vehicle is operated at different heights. The change in the feed back pressure occurring in case of such a change in the oxygen content in the air is represented by the curve $K_7$. Curve $K_7$ shows that the feed back pressure drops sharply in case of decreasing oxygen content and correspondingly shifting of the mixture to be burned in the direction of a richer mixture and thus increasing $CO_2$ content in the waste gas. At the same time, however, the change in the temperature represented by curve $K_8$ remains low for this case. A change in the oxygen content in the air thus leads to almost no change in the waste gas temperature, or only to a slight increase of the waste gas temperature, while the feed back pressure drops sharply. Thus, if the falling below of a threshold for the waste gas temperature and the falling below of a threshold for the feed back pressure are predefined as criteria for the decision explained above, then in this case the feed back pressure would fall below the associated threshold; however, in case of the waste gas temperature, such a falling below could not be observed, since the waste gas temperature remains almost the same or increases slightly. In this case, it can be concluded that a decreasing feed back pressure is not induced by a changed composition of the fuel and in this respect the correction of the feed operating state described with reference to FIG. 2 does not have to be carried out. In this case, other corrective measures compensating the changed air pressure may be introduced.

In principle, as an alternative or in addition to the evaluation of the pressure and temperature values, the respective gradient of occurring deviations from the pressure point D and the temperature point T could be taken into consideration from the relationship shown in FIG. 3.

While specific embodiments of the invention have been shown and described in detail to illustrate the application of the principles of the invention, it will be understood that the invention may be embodied otherwise without departing from such principles.

What is claimed is:

1. A fuel-operated vehicle heater operation process comprising the steps of:

providing a vehicle heater comprising: a burner area with a combustion chamber; a fuel pump for feeding fuel to the combustion chamber; a combustion air blower for feeding combustion air to the combustion chamber; a pressure sensor in association with the combustion air blower for detecting a feed back pressure downstream of the combustion air blower; and an actuating unit for actuating the fuel pump for operation of the fuel pump with a predefined value of a pump operating variable, and for actuating the combustion air blower for operation of the combustion air blower with a predefined value of a blower operating variable, in association with feed operating states with a reference fuel defined by the pump operating variable and the blower operating variable, providing reference fuel expected feed back pressure information;

detecting a feed back pressure in case of a feed operating state set during a combustion operation with a fuel of unknown grade;

comparing the detected feed back pressure with the reference fuel expected feed back pressure for the set feed operating state; and changing of the pump operating variable such that the feed back pressure changes in a direction toward the reference fuel expected feed pressure, or/and changes to essentially correspond to the reference fuel expected feed back pressure, if the detected feed back pressure deviates from the reference fuel expected feed back pressure for the set feed operating state, by determining a correction variable for the feed operating state as a function of a deviation between the detected feed back pressure and the reference fuel expected feed back pressure and changing the pump operating variable such that a feed operating state, corrected by the correction variable, is obtained, wherein a deviation between a ratio of the pump operating variable and the blower operating variable, associated with the reference fuel expected feed back pressure, and a ratio of the pump operating variable and the blower operating variable, associated with the detected feed back pressure, is determined, wherein a feed operating state deviating from the set feed operating state to a same extent as the determined deviation, but in an opposite direction of deviation, is determined as a corrected feed operating state, wherein a pump operating variable, associated with the corrected feed operating state with the blower operating variable being essentially unchanged, is used as said changed pump operating variable to obtain the corrected feed operating state.

2. The fuel-operated vehicle heater operation process in accordance with claim 1, wherein:
the combustion air blower comprises a rotatable feed wheel and the blower operating variable corresponds to a speed of the feed wheel; or
the fuel pump comprises a pump piston with periodic reciprocating motion and the pump operating variable corresponds to a rate of motion of the pump piston; or
the combustion air blower comprises a rotatable feed wheel and the blower operating variable corresponds to a speed of the feed wheel and the fuel pump comprises a pump piston with periodic reciprocating motion and the pump operating variable corresponds to a rate of motion of the pump piston.

3. The fuel-operated vehicle heater operation process in accordance with claim 1, wherein:
the combustion air blower comprises a rotatable feed wheel;
the fuel pump comprises a pump piston with periodic reciprocating motion;
the feed operating state is defined as a ratio of a speed of the feed wheel to a rate of motion of the pump piston.

4. The fuel-operated vehicle heater operation process in accordance with claim 1, wherein:
the expected feed back pressure is predefined as a command variable in association with a predefined heating operation; and
the detected feed back pressure is changed in a pressure control as a control variable by changing the pump operating variable, as a manipulated variable, in a direction toward the expected feed back pressure.

5. The fuel-operated vehicle heater operation process in accordance with claim 1, wherein:
the vehicle heater further comprises a waste gas temperature sensor for providing information about a waste gas temperature; and
a reference waste gas temperature and a reference feed back pressure are determined in association with a reference feed operating state;
the step of changing of the pump operating variable is carried out if the detected waste gas temperature and the detected feed back pressure deviate in a predefined manner from the reference waste gas temperature and from the reference feed back pressure with a set reference feed operating state.

6. The fuel-operated vehicle heater operation process in accordance with claim 5, wherein the step of changing of the pump operating variable is carried out if the detected waste gas temperature is below the reference waste gas temperature and the detected feed back pressure is below the reference feed back pressure.

7. A fuel-operated vehicle heater operation process comprising the steps of:
providing a vehicle heater comprising:
a burner area with a combustion chamber;
a fuel pump for feeding fuel to the combustion chamber;
a combustion air blower for feeding combustion air to the combustion chamber;
a pressure sensor in association with the combustion air blower for detecting a feed back pressure downstream of the combustion air blower; and
an actuating unit for actuating the fuel pump for operation of the fuel pump with a predefined value of a pump operating variable, and for actuating the combustion air blower for operation of the combustion air blower with a predefined value of a blower operating variable, in association with feed operating states with a reference fuel defined by the pump operating variable and the blower operating variable, providing reference fuel expected feed back pressure information;
detecting a feed back pressure in case of a feed operating state set during a combustion operation;
comparing the detected feed back pressure with the reference fuel expected feed back pressure for the set feed operating state; and
compensating for variations in a grade of the fuel supplied to the vehicle heater by changing the pump operating variable such that the feed back pressure changes in a direction toward the reference fuel expected feed pressure, or/and changes to essentially correspond to the reference fuel expected feed back pressure, if the detected feed back pressure deviates from the reference fuel expected feed back pressure for the set feed operating state, by determining a correction variable for the feed operating state as a function of a deviation between the detected feed back pressure and the reference fuel expected feed back pressure and changing the pump operating variable such that a feed operating state, corrected by the correction variable, is obtained, wherein a deviation between a ratio of the pump operating variable and the blower operating variable, associated with the reference fuel expected feed back pressure, and a ratio of the pump operating variable and the blower operating variable, associated with the detected feed back pressure, is determined, wherein a feed operating state deviating from the set feed operating state to a same extent as the determined deviation, but in an opposite direction of deviation, is determined as a corrected feed operating state, wherein a pump operating variable, associated with the corrected feed operating state with the blower operating variable being essentially unchanged, is used as said changed pump operating variable to obtain the corrected feed operating state.

8. The fuel-operated vehicle heater operation process in accordance with claim 7, wherein:
the combustion air blower comprises a rotatable feed wheel and the blower operating variable corresponds to a speed of the feed wheel; or
the fuel pump comprises a pump piston with periodic reciprocating motion and the pump operating variable corresponds to a rate of motion of the pump piston; or
the combustion air blower comprises a rotatable feed wheel and the blower operating variable corresponds to a speed of the feed wheel and the fuel pump comprises a pump piston with periodic reciprocating motion and the pump operating variable corresponds to a rate of motion of the pump piston.

9. The fuel-operated vehicle heater operation process in accordance with claim 7, wherein:

the combustion air blower comprises a rotatable feed wheel;

the fuel pump comprises a pump piston with periodic reciprocating motion;

the feed operating state is defined as a ratio of a speed of the feed wheel to a rate of motion of the pump piston.

10. The fuel-operated vehicle heater operation process in accordance with claim 7, wherein:

the expected feed back pressure is predefined as a command variable in association with a predefined heating operation; and the detected feed back pressure is changed in a pressure control as a control variable by changing the pump operating variable, as a manipulated variable, in a direction toward the expected feed back pressure.

11. The fuel-operated vehicle heater operation process in accordance with claim 7, wherein:

the vehicle heater further comprises a waste gas temperature sensor for providing information about a waste gas temperature; and a reference waste gas temperature and a reference feed back pressure are determined in association with a reference feed operating state;

the step of changing of the pump operating variable is carried out if the detected waste gas temperature and the detected feed back pressure deviate in a predefined manner from the reference waste gas temperature and from the reference feed back pressure with a set reference feed operating state.

12. The fuel-operated vehicle heater operation process in accordance with claim 11, wherein the step of changing of the pump operating variable is carried out if the detected waste gas temperature is below the reference waste gas temperature and the detected feed back pressure is below the reference feed back pressure.

13. The fuel-operated vehicle heater operation process in accordance with claim 7, wherein the vehicle heater further comprises a heating device, the pressure sensor being located between the heating device and the combustion air blower.

14. The fuel-operated vehicle heater operation process in accordance with claim 13, wherein the vehicle heater further comprises an evaporator medium located adjacent to the heating device.

15. The fuel-operated vehicle heater operation process in accordance with claim 7, wherein the heating device is located between the pressure sensor and the evaporator medium.

* * * * *